No. 842,946. PATENTED FEB. 5, 1907.
J. A. DELANEY & J. LAWSON.
FOLDING DUST PAN.
APPLICATION FILED MAY 24, 1906.
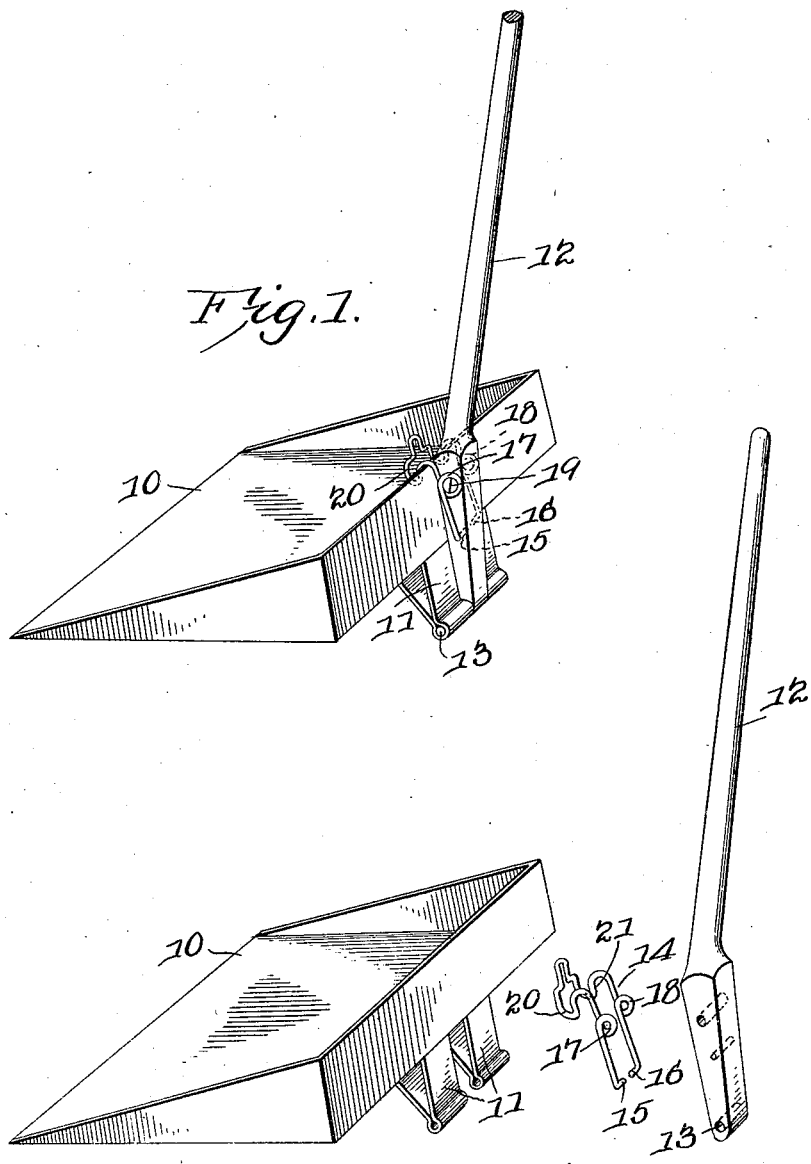
WITNESSES:
James A. Delaney
John Lawson INVENTORS
By C. A. Snow & Co.
ATTORNEYS

UNITED STATES PATENT OFFICE.

JAMES A. DELANEY AND JOHN LAWSON, OF ORANGE, MASSACHUSETTS.

FOLDING DUST-PAN.

No. 842,946.          Specification of Letters Patent.          Patented Feb. 5, 1907.

Application filed May 24, 1906. Serial No. 318,587.

*To all whom it may concern:*

Be it known that we, JAMES A. DELANEY and JOHN LAWSON, citizens of the United States, residing at Orange, in the county of Franklin and State of Massachusetts, have invented a new and useful Folding Dust-Pan, of which the following is a specification.

This invention relates to a dust-pan having a handle foldable relative thereto, and has for its object to improve the construction and increase the efficiency and utility of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportion, and minor details of construction may be resorted to without departing from the principle or sacrificing any of the advantages of this invention within the scope of the appended claim.

In the drawings, Figure 1 is a perspective view of the improved device from the rear. Fig. 2 represents the parts of the device in perspective and separated.

In the improved device is comprised a pan 10 of approved form, with a depending support 11 at the rear, whereby the floor of the pan is disposed in an upwardly and rearwardly inclined position, a handle 12, hinged at 13 to the lower or free end of the support 11. A resilient catch member is connected to the handle 12 and bears yieldably over the rear upper edge of the pan, and thus holds the handle locked in vertical position, as shown in Fig. 1. The catch (represented as a whole at 14) is formed from a single piece of resilient wire bent into substantially U shape, with the ends turned inwardly, as at 15 16, for entering apertures formed therefor in the side faces of the handle and with loops 17 18 intermediate the sides and bearing against two opposite faces of the handle and utilized for receiving holding-screws or like fastenings, one of which is shown at 19. At the central bend the catch member 13 is bent to form loops 20 21 for bearing over the rear side of the dust-pan, and thus lock the handle yieldably against the same. By this means the pan may be arranged in substantial alinement with the handle or at right angles thereto or swinging therefrom, as may be preferred.

When the device is required for use, the pan portion is placed on the floor and the handle elevated and the loop portions 20 21 "snapped" over the rear wall of the pan and the handle thereby locked at right angles to the pan in position for use. When the pan is not required, a relatively hard pull upon the handle rearwardly while the pan is held upon the floor by one foot of the operator or otherwise held will overcome the force of the spring-catch, and thus release the pan and permit the device to be disposed in any suitable manner, as by suspending by the free portion of the catch.

The coils 17 18 not only serve the purpose of a means for holding the screws or nails by which the catch is fastened to the handle, but also serve as spring-coils which coact with the bent portion 20 21 to hold the catch yieldably in locked position.

The wire from which the catch member is constructed is of sufficient gage or strength to resist the accidental release of the pan or to resist the normal strains to which the parts will be subjected while in use, but will yield to abnormal strains imparted thereto when the relative positions of the parts are to be changed.

Having thus described the invention, what is claimed is—

A dust-pan having a depending rear support, a handle swinging from the terminal of said support, a resilient catch formed from a single piece of wire bent into substantially U shape with coils intermediate the sides and bearing against opposite faces of the handle and with terminals extending into the same, said catch member connected to the handle by fastening elements operating through said coils and the bent portion of said catch member yieldably bearing over the rear portion of the dust-pan to hold the same locked to the handle.

In testimony that we claim the foregoing as our own we have hereto affixed our signatures in the presence of two witnesses.

JAMES A. DELANEY.
JOHN LAWSON.

Witnesses:
EDWIN A. WILLARD,
JEAN KARLSON.